United States Patent
Budinger et al.

(10) Patent No.: US 6,802,032 B1
(45) Date of Patent: Oct. 5, 2004

(54) METHOD AND APPARATUS FOR PERFORMING SYSTEM DIAGNOSTICS ON A CABLE MODEM TERMINATION SYSTEM USING A HAND HELD COMPUTING DEVICE

(75) Inventors: Dan Budinger, Arlington Heights, IL (US); Irene Gilbert, Palatine, IL (US); John G. Fijolek, Naperville, IL (US)

(73) Assignee: UTStarcom, Inc., Alameda, CA (US)

( * ) Notice: Subject to any disclaimer, the term of this patent is extended or adjusted under 35 U.S.C. 154(b) by 614 days.

(21) Appl. No.: 09/584,926

(22) Filed: May 31, 2000

Related U.S. Application Data (60) Provisional application No. 60/170,399, filed on Dec. 13, 1999.

(51) Int. Cl.[7] ................................................. G06F 11/00
(52) U.S. Cl. .............................. 714/46; 714/45; 714/57; 709/221
(58) Field of Search .............................. 714/46, 57, 44, 714/43, 40, 25, 37; 709/220, 221; 370/252, 258, 255

(56) References Cited

U.S. PATENT DOCUMENTS

| | | | | |
|---|---|---|---|---|
| 5,357,519 A | * | 10/1994 | Martin et al. .................. | 714/25 |
| 5,619,489 A | * | 4/1997 | Chang et al. ................ | 370/241 |
| 5,884,202 A | * | 3/1999 | Arjomand ..................... | 701/29 |
| 6,516,427 B1 | * | 2/2003 | Keyes et al. .................. | 714/25 |
| 6,535,838 B2 | * | 3/2003 | Abraham et al. ........... | 702/183 |
| 6,588,016 B1 | * | 7/2003 | Chen et al. ................. | 725/111 |
| 2003/0048756 A1 | * | 3/2003 | Chang et al. ................ | 370/252 |

* cited by examiner

*Primary Examiner*—Scott Baderman
*Assistant Examiner*—Joshua Lohn
(74) *Attorney, Agent, or Firm*—McDonnell Boehnen Hulbert & Berghoff LLP (57) ABSTRACT

The present invention provides a method for testing and diagnosing a cable modem termination system, using a hand-held computing device. The hand-held computing device establishes a connection with the cable modem termination system through a wireless infrared and radio frequency connection, a serial, or a local area network connection. After the connection is established, a set of commands residing in the hand-held device are transmitted to configure the cable modem termination system. The cable modem termination system sends back a response that is displayed on a command screen of the hand-held device to identify status and error messages. A cable modem termination system operator can send a set of configuration instructions to the cable modem termination system by utilizing stored sets of configuration instructions. Using the hand-held device allows easy accessibility in remote locations with limited space for diagnostics and equipment.

18 Claims, 6 Drawing Sheets

METHOD AND APPARATUS FOR PERFORMING SYSTEM DIAGNOSTICS ON A CABLE MODEM TERMINATION SYSTEM USING A HAND HELD COMPUTING DEVICE

This applications claims the benefit of provisional application No. 60/170,399, filed Dec. 13, 1999.

FIELD OF INVENTION

The present invention relates to communications gear. More specifically, it relates to performing system diagnostics on communications equipment.

BACKGROUND OF THE INVENTION

Communications equipment used for data networking, such as cable modem equipment, is typically located in remote or difficult to access locations. These locations tend to have limited space for the use of diagnostic equipment used to test communications equipment and isolate faults.

Examples of communications equipment used for data networking are the telecommunications systems and cable television systems that have provided various types of services to the public for many years. The public demand has grown steadily for new types of networks. Currently, an estimated 95 million homes in the U.S. alone are wired for cable, and about 97% of U.S. households have access to cable. As cable television systems have become requisite, so have the broadband communications networks systems using cable modems. Cable TV (CATV) systems use either fiber optic cable or more typically, a HFC (hybrid fiber coaxial) cable combination, to deliver information into the home. Home access via coaxial cable, rather than a pair of copper wires, provides a much wider bandwidth. A telephone voice connection requires less than 4 kHz of bandwidth, while a television channel occupies a 6 MHz, or 1500 times as much. By using networking technology the cable operator or a broadband Internet Service Provider can use most of the bandwidth of a dedicated TV channel achieving a downstream data rate up to 38 Mbps which is hundred times faster than telephone technology. With proper repeaters, coaxial cable systems can easily support several GHz of bandwidth.

As cable television systems have become wipespread, so have the broadband communications networks systems using cable modems. Current internet access via 28.8 kbps, 33.6 kbps, or 56 kbps modem is referred to as voiceband modem technology. Like voiceband modems, cable modems modulate and demodulate data signals as well. Cable modems incorporate more functionality suitable for high-speed internet services. The data from the network to the user is referred to as downstream, whereas data from the user to the network is referred to as upstream in a cable network. The upstream and downstream data rates may be flexibly configured using cable modems to match subscriber needs. Cable modems use either a standard telephone line or a QPSK/QAM (quaternary phase shift keying/quadrature amplitude modulation) modem over a two-way cable system to transmit data upstream from a user location to the network.

In one cable modem implementation, the cable company supplies cable television, regular phone and internet services. To operate a cable modem, the subscriber will first need a cable access unit (CAU) installed at the cable entrance to the house. The CAU bridges the cable and separates the low-frequency phone access from video signals on the downstream path (to you) and injects telephony signals into the upstream path (from you). The CAU features standard telephone interface connectors to accommodate a conventional telephone and a coaxial connection for the cable interface. A cable modem that is located near a computer will connect the subscriber's computer to CAU in order to communicate with online services. The modem typically offers throughput speeds of up to 10 Mbps per user in the downstream direction and 700 kbps or more in the upstream direction.

In another cable modem implementation, currently offered by a TV cable service provider, a special network card has to be installed in the user's PC. The card is connected to the cable modem, which is located next to the computer. The incoming cable is split in two, one going to TV sets as before, the other feeding the cable modem. In this implementation, no regular phone service is provided over the cable. When users turn their computers on, they are immediately connected to the internet with no dialing required.

When providing phone service, the cable operator will need some additional equipment at the head-end of the CATV system, a CMTS (cable modem termination system) to combine voice-band telephone channels and pass them to a switch, and the CCU (cable control unit) to communicate with the CAUs to act as a protocol converter from the cable plant to a local telephone office. It allows the cable operator to integrate telephony and enhanced data services with the existing CATV signals. At the head-end is also the CAB (cable access router) which provides an interface between a hybrid fiber/coaxial transmission system and local and remote TCP/IP (transmission control protocol/internet protocol) networks such as the internet.

Data from individual users is filtered by upstream demodulators or telephone-return systems for further processing by a CMTS at the cable head-end. A CMTS can be described as a data switching system designed to route data from all the cable modem users over a multiplexed network interface as well as from the internet. Therefore, CMTS is an important support of data services that integrate upstream and downstream communication over a cable data network. Operational tasks of monitoring, provisioning and testing of various components of a CMTS are required to configure and manage a CMTS.

There is a need to evaluate the present operating states of the network equipment for diagnostic capability and equipment security. As noted above, the cable environment has limited space for diagnostics equipment since much networking gear is located in remote locations. A network trouble shooter must carry, at minimum, a laptop computer to the remote site to display equipment status by accepting commands and configurations for the equipment. Although notebook computers are smaller, a more practical and convenient diagnostic method is needed.

In the conventional art, a network technician typically carries a laptop computer to the remote site. The laptop computer is plugged into the network equipment to be tested. The laptop computer is used to display the equipment status and to accept command inputs and configuration data for the equipment. However, it is often difficult to access the network equipment in order to plug the laptop computer into the network device.

Therefore, the needs remains for a more convenient method of connecting to network equipment for performing testing and diagnostics.

SUMMARY OF THE INVENTION

The present invention is directed toward a method for testing and diagnosing network equipment using a handheld computer that communicates with the network equipment using a wireless connection.

In a cable television system, the headend CMTS (Cable Modem Termination System) takes advantage of a high speed communications platform to allow cable television operators to build high-density, highly scalable communication system for data-over cable services. The central component of the CMTS is the CAR (Cable Access Router) which offers routing from the internet to the RF (radio frequency) network. The CAR and NIC (Network Interface Card) work together to provide RF output in one 6 Mhz, DOCSIS (Data Over Cable Service Interface Specifications) compliant data cable channel. The CAR and the URC (Upstream Receiver Card) operate together to process and route all upstream data sent from cable modem and to schedule the broadcast of MAC (Media Access Control) messages required for cable modems to initialize and register with the CMTS.

According to an exemplary embodiment of the present invention, a cable modem in a cable modem television system registers with the head-end CMTS (Cable Modem Termination System) to establish a data connection to the cable television system high speed communications platform. Preferably, the cable modems accessing the CMTS are compliant with the DOCSIS (Data over Cable Systems Interface Specification) standards. When cable modems cannot successfully register with the CMTS of the CAR, then CLI (Command Line Interface) commands can be utilized to obtain the connection status of the cable modem and troubleshoot the registration failure of the cable modem in order to assist in modem installation. According to this embodiment, a handheld computing device is interfaced with the cable modem in order to transmit CLI commands and receive responses to identify modem status and error messages.

According to another embodiment of the present invention, the handheld computing device, such as a Palm III PDA, can be interfaced to the networking equipment such as the CMTS or cable modem to provide configuration, monitoring or diagnostic capability. The handheld device can be interfaced with the CMTS by several different methods. In the exemplary embodiment, the handheld device is interfaced is interfaced to the CMTS device via an Infrared Data (IrDa) port on the Palm III. According to another embodiment, if the IrDa port is not available on the equipment, the PDA can also be connected to the equipment via serial connection or LAN (local area network) port.

In any connection method, the PDA may be running diagnostics software, configuration software or terminal emulation software to configure and monitor the network equipment. In the cable environment, much networking gear is located in remote locations which tend to have very limited space for diagnostics and equipment. In the current state of technology, a network trouble shooter must carry at minimum a laptop computer to the remote site for use in displaying equipment status by accepting commands and configurations. The portability of a handheld device such as a Palm device is uniquely advantageous for trouble shooting network equipment such as cable modems. The portability of a handheld device such as a Palm computer is uniquely advantageous for on-site installation and troubleshooting of network equipment.

Palm also supports fundamental DOCSIS programs which can program modem configuration and act as a network manager to modem SNMP (simple network manager protocol) agent. PDA can also be used to transfer a previously developed application of software with a stored set of CLI (command line interface) configuration commands and data without having to reenter command lines for configuration and MIB (management information base) support for SNMP (simple network management protocol). Remote software can also be downloaded over an IR port, LAN port or serial port to perform load updates. The software on the PDA also has the capability of converting collected network data into graphical form, which can be useful for analysis.

BRIEF DESCRIPTION OF THE DRAWINGS

The features of the present invention are set forth with particularity in the appended claims. Preferred embodiments of the present invention are described with reference to the following drawings, wherein:

DETAILED DESCRIPTION OF THE INVENTION

The present invention provides a method for testing network equipment for communications systems, such as CATV (cable television) systems, using a hand-held computing device. Depending on the network architecture used, some or all of the configuration tasks may be performed.

There are three basic network architectures for data networking using cable based systems. The first architecture is called the one-way where analog modem technology and the PSTN (public switched telephone network) are used in the upstream path under DOCSIS (data over cable system interface specification). Downstream of 38 Mbps at 256 QAM and 33.6 Kbps upstream speeds are well suited to internet applications, such as World Wide Web or FTP (file transfer protocol). The second architecture is called the two-way (RF return) which uses RF transmission for both the upstream and downstream paths built to DOCSIS standards. Downstream of 38 Mbps at 256 QAM and 10 Mbps at 16 QAM upstream speeds are well suited to many internet and business applications. The third architecture for data flow is called the three-way, which combines the functionality of both the one-way and two-way architectures and built to DOCSIS standards. One example would be to configure a DHCP server to allocate IP addresses and network configuration information to client cable modems and their associated CPE (customer premises equipment) devices registering with the CMTS.

Exemplary Data-over-cable System

Figure 1:
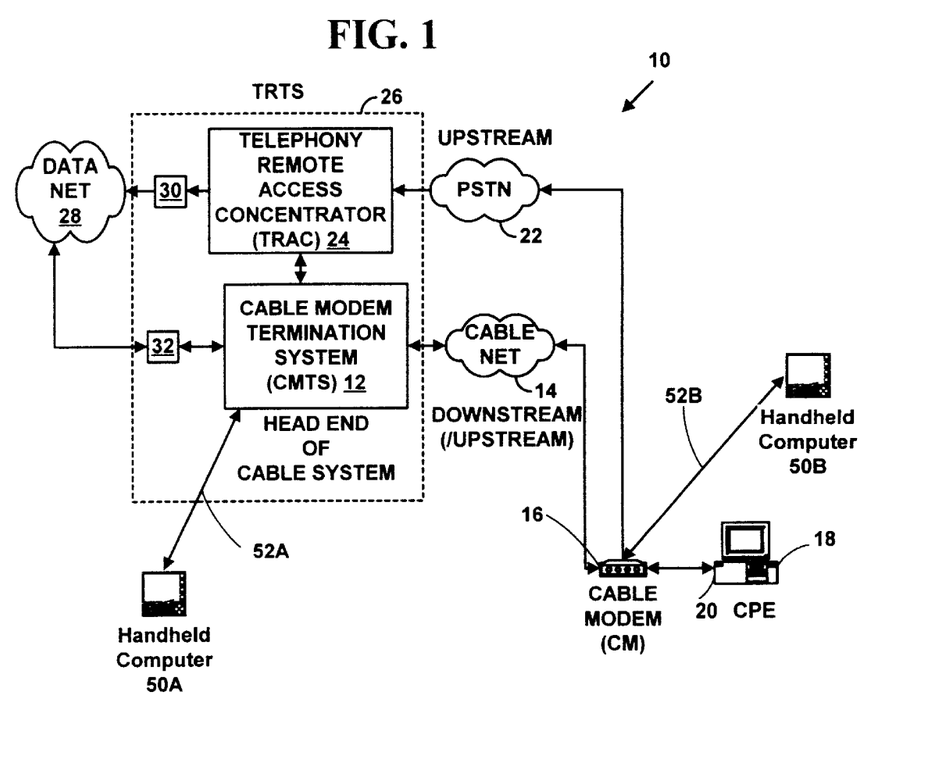
FIG. 1 is a block diagram of a system architecture illustrating the use of a hand-held computer according to the present invention.

FIG. 1 is a block diagram of a system architecture illustrating the use of a hand-held computer according to the present invention in a data-over-cable system 10. In a data-over-cable system, a downstream data path refers to the flow of data from a cable television network "headend" to customer premise equipment (e.g., a customer's personal computer). The cable television network headend is a central location that is responsible for sending cable signals in a downstream direction. A return path 16 via a telephony network ("telephony return") is typically used for an "upstream" data path in unidirectional cable systems. An upstream data path is the flow of data from customer premise equipment back to the cable television network headend.

Of course, the present embodiment of the cable modem analyzer is not limited to a data-over-cable system with telephony return. The cable modem analyzer may be utilized in a data-over-cable system 10 providing a bi-directional data path (i.e., both downstream and upstream) without telephony return as is also illustrated in FIG. 1. In a data-over cable system without telephony return, customer premise equipment or a cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12.

In one preferred embodiment of the present invention, the CMTS 12 is a Total Control hub by 3Com Corporation of Santa Clara, Calif., with a cable modem termination unit. A Total Control hub is a chassis with multiple networking cards connected by a common bus. An exemplary Total Control hub is described in U.S. Pat. No. 5,528,595, granted to Dale M. Walsh et al., and incorporated is herein by reference. However, the CMTS 12 could also be another network servers including those by Lucent Technologies of Murray Hill, N.J., Livingston Enterprises, Inc. of Pleasanton, Calif., Ascend Communications of Alameda, Calif., Cisco Systems, Inc., of San Jose, Calif. and others.

The Cable network 14 includes cable television networks such as those provided by Comcast Cable Communications, Inc., of Philadelphia, Pa., Cox Communications, or Atlanta, Ga., Tele-Communications, Inc., of Englewood Co., Time-Warner Cable, of Marietta, Ga., Continental Cablevision, Inc., of Boston, Mass., and others. The cable network 14 is connected to a Cable Modem ("CM") 16 with a downstream cable connection. The CM 16 is a cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga., General Instruments of Horsham, Pa., and others. FIG. 1 illustrates one CM 16. However, in a typical data-over-cable system, tens or hundreds of thousands of the CMs 16 are connected to the CMTS 12. The CM 16 is connected to Customer Premise Equipment ("CPE") 18 such as a personal computer system via a Cable Modem-to-CPE Interface ("CMCI") 20.

One CPE 18 is illustrated in FIG. 1. However, the CM 16 may have multiple CPEs 18 attached (Not illustrated in FIG. 1). In one preferred embodiment of the present invention, the CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, Sprint, MCI and others. The upstream telephony connection is any of a standard telephone line connection, Integrated Services Digital Network ("ISDN") connection, Asymmetric Digital Subscriber Line ("ADSL") connection, a wireless connection or other telephony connection. The PSTN 22 is connected to a Telephony Remote Access Concentrator ("TRAC") 24.

In another embodiment of the present invention, in a data-over cable system without telephony return, the CM 16 has an upstream connection to the CMTS 12 via a cable television connection, a wireless connection, a satellite connection, or a connection via other technologies to send data upstream outside of the telephony return path. In such an embodiment, the CMTS 12 may also provide data streams involving voice, video or data information to a CM 16, or CPE 18 from the PSTN 22 even when a telephony return path is not used.

FIG. 1 illustrates a telephony modem integral to the CM 16. In another embodiment of the present invention, the telephony modem is a separate modem unit external to the CM 16 used specifically for connecting with the PSTN 22. A separate telephony modem includes a connection to the CM 16 for exchanging data. In yet another embodiment of the present invention, the CM 16 includes functionality to connect only to the cable network 14 and receives downstream signals from the cable network 14 and sends upstream signals to the cable network 14 without using the telephony return path. The present invention is not limited to cable modems used in a data-over-cable system with telephony return.

In one preferred embodiment of the present invention of the telephony return, the TRAC 24 is a Total Control Telephony Hub by 3Com Corporation of Santa Clara, Calif. However, the TRAC 24 could also be a telephony hub including those by Lucent Technologies of Murray Hill, N.J., Livingston Enterprises, Inc. of Pleasanton, Calif., Ascend Communications of Alameda, Calif. and others.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of cable network 14. The TRAC 24 may be located in a different geographic location from the CMTS 12. Content servers, operations servers, administrative servers and maintenance servers used in data-over-cable system 10 (not shown in FIG. 1) may also be in different locations. Access points to the data-over-cable system 10 are connected to one or more of the CMTS 12, or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28 (e.g., the Internet, an intranet or other LAN) by a TRAC-Network System Interface 30 ("TRAC-NSI"). The CMTS 12 is connected to data network 28 by a CMTS-Network System Interface ("CMTS-NSI") 32. The CMTS 12 may send and receive data to/from a CM 16 or a CPE 18 via the PSTN 22 even if telephony return is not used. The present invention is not limited to data-over-cable system 10 illustrated in FIG. 1, and more or fewer components, connections and interfaces could also be used. The present invention may also be used in a data-over-cable system 10 with or without telephony return.

Further illustrated in FIG. 1 is the connection of hand-held computers 50A and 50B to portions of cable system 10 in order to perform testing, diagnostics or configuration. Hand-held computer 50A is connected to CMTS 12 via connection 52A, which is preferably wireless. Similarly, hand-held computer 50B is connected to CM 16 via connection 52B, which is preferable wireless. The hand-held computers 50A and 50B download CLI commands over connections 52A and 52B, respectively, to CMTS 12 and CM 16, respectively.

Examples of CLI commands are set forth in "Cable Access Router User Guide", 3Com Corporation Part No. 1.024.1740-00, published October 1998, herein incorporated by reference for all purposes. Responses from CMTS 12 and CM 16 are similarly communicated to hand-held computers 50A and 50B, respectively, via communication links 52A and 52B for display and further processing.

Figure 2A:
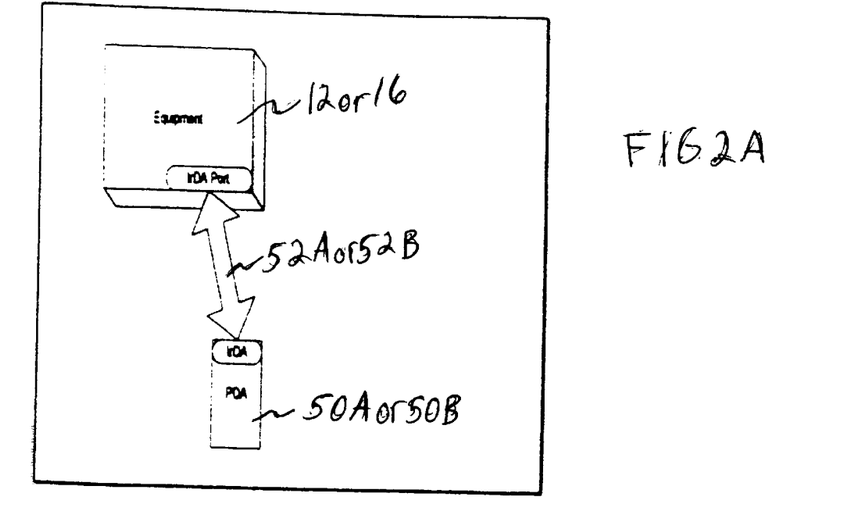
FIG. 2A illustrates the method by which the PDA connects to the network equipment by a means of IrDa port.
Figure 2B:
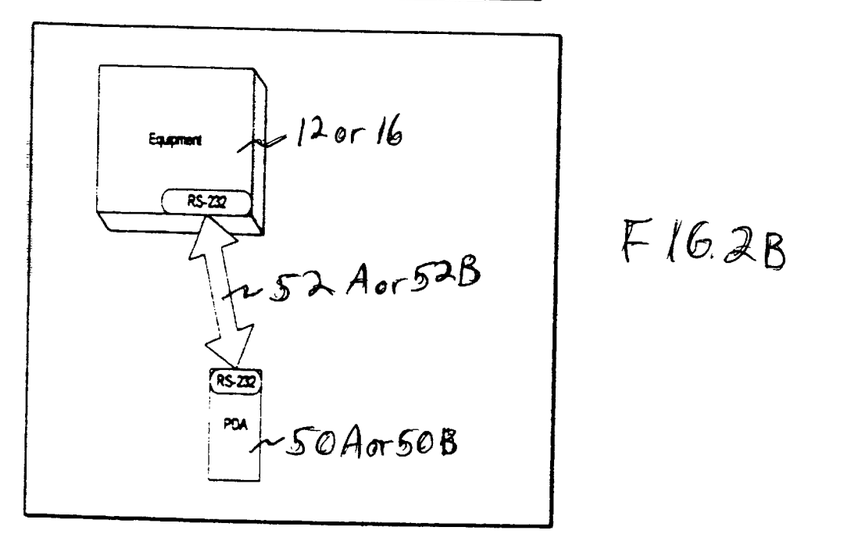
FIG. 2B illustrates the method by which the PDA connects to the network equipment by a means of serial port.

FIGS. 2A and 2B illustrate the connections 52A or 52B by which the handheld computers 50A or 50B connect to the network equipment such as CMTS 12 or CM 16. In FIG. 2A, connection 52A or 52B is a wireless infrared connection maintained between infra-red ports, such as IrDA ports, present in hand-held computer 50A or 50B and the CMTS 12 or CM 16. Other types of wireless connections, such as RF connections (e.g. Bluetooth), can be substituted for the IrDA connection, in which case RF interface ports are installed in the hand-held computer 50A or 50B and the CMTS 12 or CM 16. Also, the connection 52A or 52B can be a wired RS-232 connection, such as a LAN (local-area network) port or serial port, as is shown in FIG. 2B.

Figure 3A:
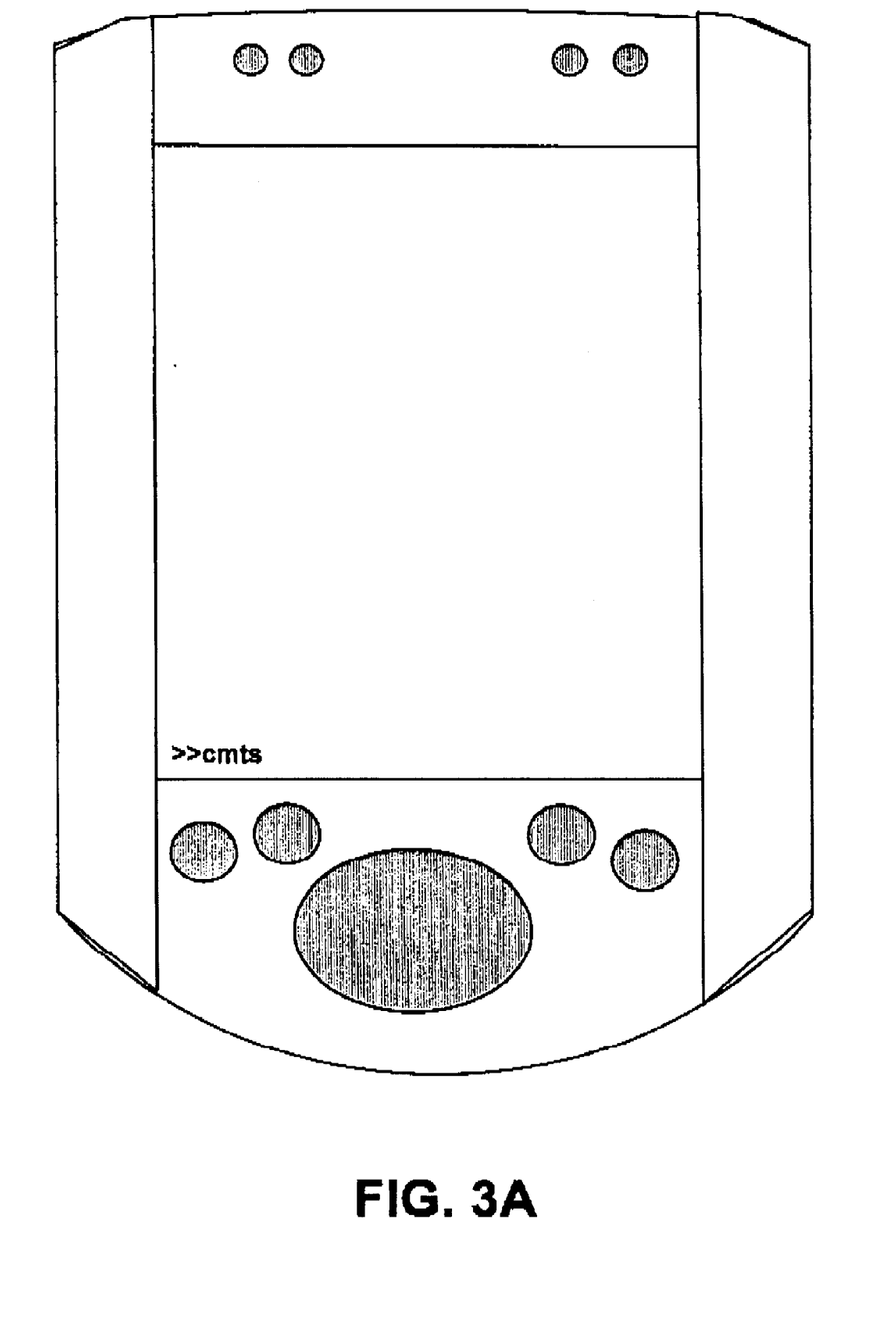
FIGS. 3A to 3D illustrate the command screen displayed on the PDA when connected to the CMTS.
Figure 3B:
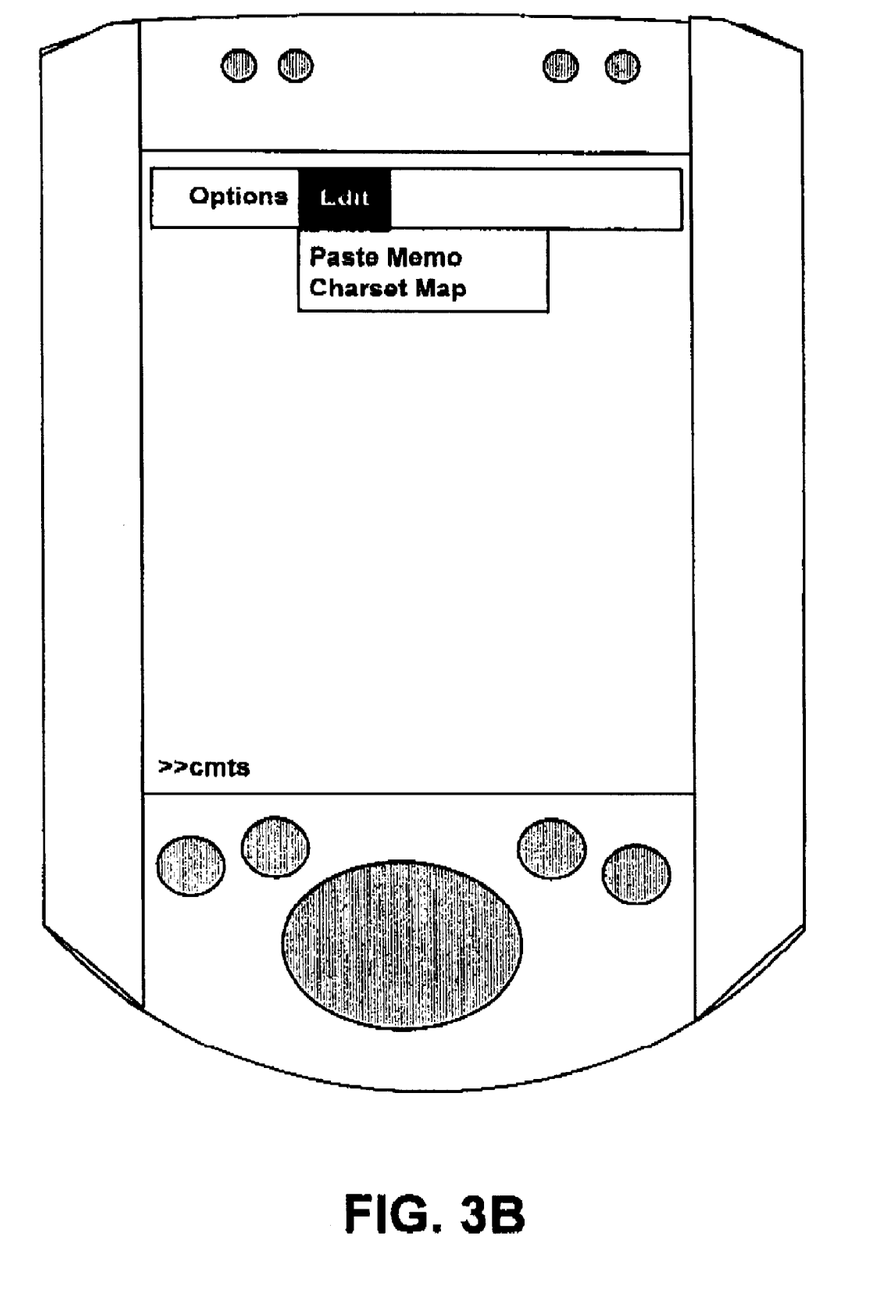
Figure 3C:
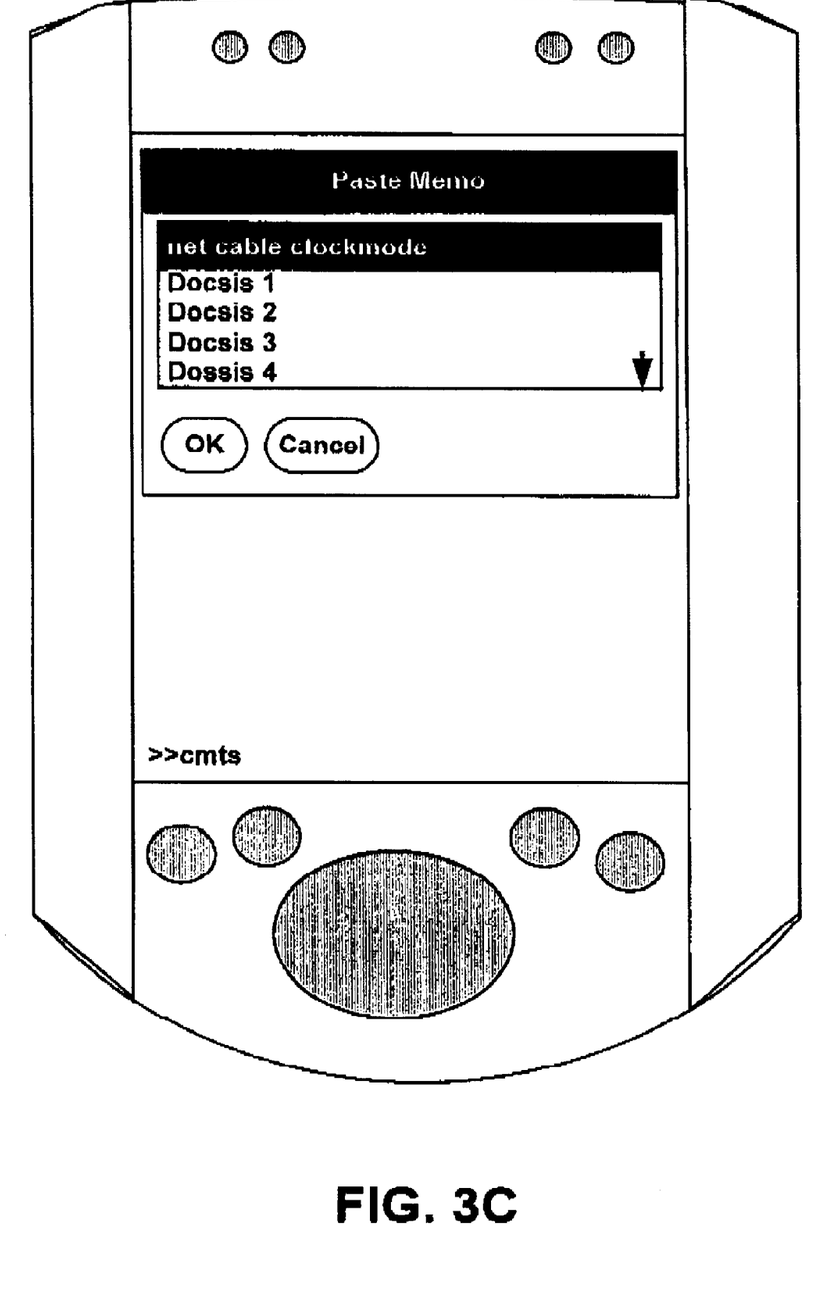
Figure 3D:
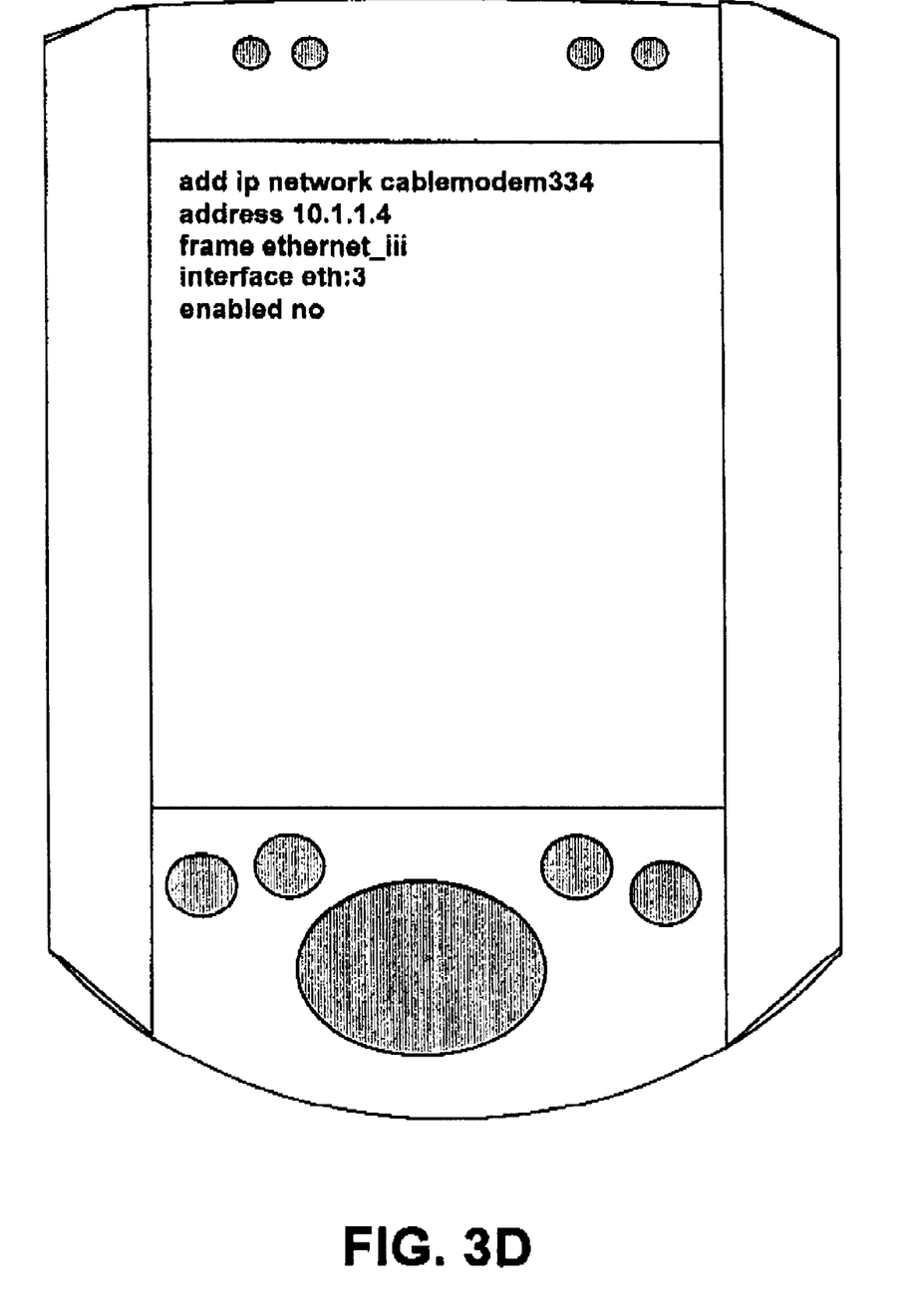

The command screens displayed on hand-held computers 50A and 50B during an example of a connection event with CMTS 12 or CM 16 are shown in FIGS. 3A to 3D. FIG. 3A shows a blank screen as the PDA is connected to the network device CMTS 12 or CM 16, awaiting network data input from the network device. FIG. 3B shows the selection option for the cable operator to send a configuration instruction set. FIG. 3C shows the name of the configuration of the file as saved in a text format. Finally, FIG. 3D illustrates the file as transmitted to the CMTS 12 or CM 16 for test, configuration or diagnostics.

The method according to the present invention provides for a PDA to be used to apply already developed scripting software for universal configuration. A set of CLI (command line interface) commands can be stored in the PDA as shortcuts. For instance, we can define the command "list ip network" as control-L so the entire command does not always have to be entered. The CAR (cable access router) CLI (command line interface) commands allow for implementation of parameters, configuration and trouble shooting the network equipment.

The following Table 1 is an example of a command format shown on the PDA.

TABLE 1 add ip network<network_name.
address [ip_net_address]
frame [ethernet_ii | snap]
{0 interface [eth:1] }
{0 enabled [yes] }

Where "add ip network" is the command and "<network_name>" is the required value for the command. "Address" is a required parameter and "[ip_net_address]" is the value for the address parameter which must be provided. "Frame" is another required parameter and "[ETHERNET_II SNAP]" are the value from which to choose for frame type. "Interface" is required only to override the default value which is "eth:1". "Enabled" is required to override the default which is "yes".

The software on the PDA also has the capability of converting collected data into graphical forms. This can be important for statistical analysis as well as visual representation of the overall network data collected. Not only is the hand-held computing device useful for performing diagnostics of the network equipment, but the hand-held device can maintain a memory containing the commands downloaded to the network device. The hand-held device also provides for convenient and flexible configuration of devices by maintaining configuration data and permitting manipulation of the configuration data as needed for testing, diagnostics or installation.

In view of the wide variety of embodiments to which the principles of the invention can be applied, it should be understood that the illustrated embodiments are exemplary only, and should not be taken as limiting the scope of the present invention. In addition, the present invention can be practiced with a variable combination of software and hardware.

What is claimed is:

1. A method for testing and diagnosing a cable modem termination system using a hand-held device comprising the steps of:
    (a) connecting said hand held device to said cable modem termination system;
    (b) transmitting a set of command line interface commands residing in said hand-held device to said cable modem termination system;
    (c) receiving a response from said cable modem termination system;
    (d) displaying said response on a command screen of said hand-held device;
    (e) showing a selection to send a set of configuration instructions to said cable modem termination system; and
    (f) sending said set of configuration instructions to said cable modem termination system, wherein the set of configuration instructions alter cable modem termination system parameters that are used in the operation of the cable modem termination system after the hand held device is disconnected from the cable modem termination system.

2. The method of claim 1, wherein connecting said hand-held device to said cable modem termination system includes a wireless connection, a serial connection, or a local area network connection.

3. The method of claim 2, wherein said wireless connection includes an infrared connection or a radio frequency connection to said cable modem termination system.

4. The method of claim 1, further comprising the step of storing said set of configuration instructions transmitted to said cable modem termination system.

5. The method of claim 4, wherein said set of configuration instructions program and configure said cable modem termination system.

6. The method of claim 4, wherein said set of configuration instructions are data over cable system interface specification ("DOCSIS") program compliant.

7. The method of claim 3, further comprising the step of downloading software through said serial connection, said local area network connection, said infrared connection or said radio frequency connection into said hand-held device.

8. The method of claim 7, further comprising the step of manipulating a set of network data for testing by said software in said hand-held device.

9. The method of claim 8, further comprising the step of converting said set of network data into a statistical analysis by said software in said hand-held device.

10. The method of claim 9, further comprising the step of converting said set of network data into graphical forms by said software in said hand-held device.

11. The method of claim 1, further comprising the step of storing said set of command line interface commands in said hand-held device.

12. The method of claim 11, further comprising the steps of:

storing said set of command line interface commands in said hand-held device; and updating said set of command line interface commands with said software.

13. The method of claim 1, wherein said hand held device is a personal digital assistant.

14. A hand-held device for testing and diagnosing a cable modem termination system, the hand-held device comprising:

a processor;

memory; and instructions stored in the memory and executable on the processor to i) connect said hand held device to said cable modem termination system, ii) transmit a set of command line interface commands residing in said hand-held device to said cable modem termination system, iii) receive a response from said cable modem termination system, iv) display said response on a command screen of said hand-held device, v) show a selection to send a set of configuration instructions to said cable modem termination system, and vi) send said set of configuration instructions to said cable modem termination system, wherein the set of configuration instructions alter cable modem termination system parameters that are used in the operation of the cable modem termination system after the hand held device is disconnected from the cable modem termination system.

15. The hand-held device of claim 14, further comprising instructions stored in the memory and executable on the processor to i) download software through a serial connection, a local area network connection, an infrared connection or a radio frequency connection with the cable modem termination system into the hand-held device, ii) manipulate a set of network data for testing by the software in the hand-held device, and iii) convert the set of network data into a statistical analysis by the software in the hand-held device.

16. The hand-held device of claim 15, further comprising instructions stored in the memory and executable on the processor to convert said set of network data into graphical forms for display on the hand-held device.

17. The hand-held device of claim 14, wherein the hand-held device is a personal digital assistant.

18. The method of claim 14, wherein said set of configuration instructions are data over cable system interface specification ("DOCSIS") program compliant.

* * * * *